J. & A. NICLAUSSE.
AXLE FOR MOTOR ROAD VEHICLES.
APPLICATION FILED FEB. 10, 1914.
Reissued Oct. 10, 1916.
14,201.
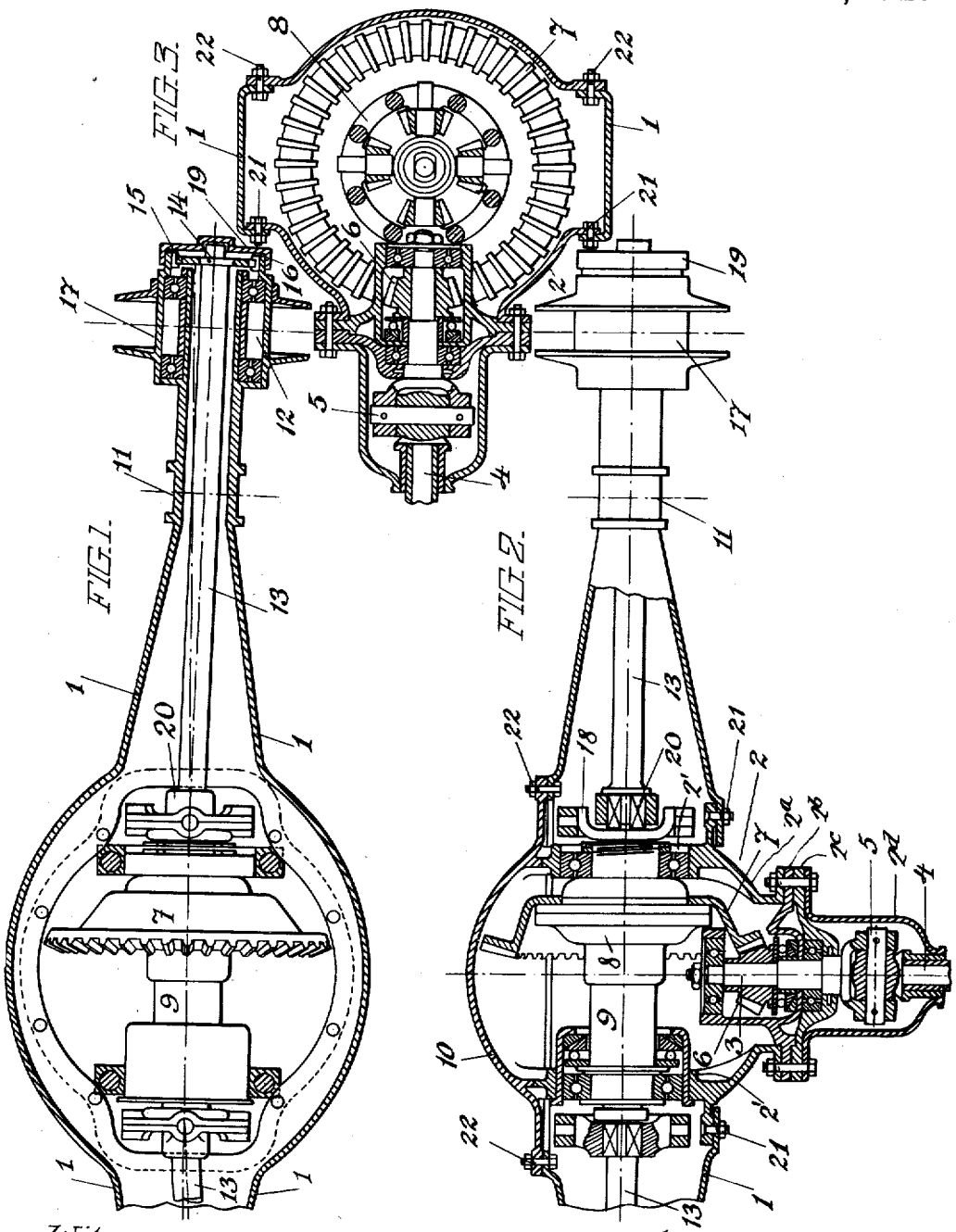
Witnesses:
A. G. Russell
N. C. Loental
Inventors:
Jules Niclausse and
Albert Niclausse
By Ray S. Gehr Attorney.

UNITED STATES PATENT OFFICE.

JULES NICLAUSSE AND ALBERT NICLAUSSE, OF PARIS, FRANCE, ASSIGNORS TO GEORGE B. PITTS, OF CLEVELAND, OHIO.

AXLE FOR MOTOR ROAD-VEHICLES.

14,201. Specification of Reissued Letters Patent. Reissued Oct. 10, 1916.

Original No. 899,891, dated September 29, 1908. Serial No. 312,483, filed April 18, 1906. Application for reissue filed February 10, 1914. Serial No. 817,942.

*To all whom it may concern:*

Be it known that we, JULES NICLAUSSE and ALBERT NICLAUSSE, residing at the city of Paris, Republic of France, have invented a new and useful Improvement in Axles for Motor Road-Vehicles, which improvement is fully set forth in the following specification.

Motor axles up till now have been made in several pieces cast or forged which were then bolted or brazed together. This method, by reason of the different parts, is not very reliable because of the possibility of the bolts coming loose or of the parts breaking where they are brazed, and this draw-back was becoming greater because of the constant increase in the weight of motor vehicles and in the increased horse power of the motors.

The disadvantages mentioned as far as the necessity of splaying the driving wheels is concerned, has resulted in employing fixed axles supporting the differential mechanism or else special axles with hollow axle journals admitting of an outside mechanism.

This invention has for its object a rear axle or tubular bridge for motor road vehicles made in one piece without brazed joints, forming a gear case and allowing of taking away in a single piece all the transmission mechanism contained; its general formation making it possible to splay the driving wheels.

According to the present invention the body of the axle is a tube usually made of steel in one piece without any brazed joints, contracted at its ends, and enlarged in the middle so as to present a form of equal resistance which gives a minimum of weight with the maximum of rigidity without adding strengthening pieces.

The central part forms a kind of annular chamber and has two openings allowing of introducing into the axle the different pieces of mechanism forming the differential and transmission gear after they have been assembled. One of the openings is closed by the support for the transmission mechanism of the motor, the other is closed by a sort of cover which allows of inspecting the axle mechanism without taking it down and without touching the coach work as one is obliged to do with the types of axle now in use.

The contracted end of the tubular axle forms a support for the annular axle box of the driving wheels, for this purpose passing inside the hub which is driven by means of a transmission on the axle. By this means it is possible to splay the driving wheels by inclining the two parts of the tubular axle at a suitable angle to the horizontal. In order to effect this it is obviously necessary to employ a form of transmission not in line between the differential gear and the driving wheels. This transmission is effected in this invention by shafts on either side of the differential gear by means of Cardan joints.

In the accompanying drawings which illustrate one way of carrying out our invention: Figure 1 is a longitudinal vertical section. Fig. 2 is a plan view, part being a horizontal section. Fig. 3 is a transverse section on the line A A Figs. 1 and 2.

As is shown in the drawings the motor axle comprises a tubular casing 1 made in one piece without any brazed joints, with an enlarged part in the middle. This enlarged part has two openings of which one is closed by the support 2 introduced and put in place through the other opening. This support 2, $2^a$, $2^b$, $2^c$, $2^d$, carries or contains all the internal transmission mechanism that is to say, the axle 3 receiving its movement from the change speed gear by means of intermediate shaft 4 through the Cardan joint 5, the bevel gearing 6 and 7, the differential gear 8, and the longitudinal shaft 9. The axle 3 and differential gear 8 are suitably supported for operation, the former being mounted in bearings arranged at either side of the gear 6 and carried by the support 2, and the latter having its two hubs, one of which is formed by the shaft 9, mounted in bearings carried by bearing lugs 2′, 2′ on the support 2. The second opening, large enough to pass the assembled transmission mechanism just mentioned mounted on the support 2 is closed by a cover 10 which allows of getting at the internal mechanism without taking anything down. The contracted parts of the axle 1 have bearings 11 to which are fastened the springs which suspend the carriage and receive at their ends the annular axle boxes 12 of the driving wheels. The axle boxes are driven from the differential gear 8 by shafts 13 inside the axle having at their end a disk 14 with projections 15 engaging with corresponding recesses 16 on the hub 17 of the driving wheels. This arrangement makes it easily possible to make the different pieces larger longitudinally. The two halves of the axle 1, instead of being in line with one another, form, in the case where it is desired to splay the wheels, a certain angle with one another in a vertical plane as is shown in the drawing Fig. 1. The shafts 13 are then connected to the differential 8 by the Cardan joints 18.

As a result of the relative arrangement of the different parts it is sufficient when taking to pieces the transmission mechanism to simply unscrew the caps 19 of the wheel hubs to remove the two shafts 13 whose square ends 20 engage the Cardan joints 18, then to unfasten the shaft 4 at its front or back joint, and lastly to unscrew respectively the bolts 21 of the support 2 and 22 of the cover 10 in order to be able to draw out in a single piece the whole of the transmission mechanism.

The parts are assembled by performing the above operations in the reverse order, the parts being then completely protected from dust the axle and its cover forming a casing.

This invention can naturally be applied to axles now in use while following the essence of the invention by making any modifications required by the circumstances.

Having now particularly described and ascertained the nature of our said invention and in what manner the same is to be performed, we declare that what we claim is:

1. In a motor vehicle, the combination, with an axle comprising a tubular body with an enlarged middle portion having oppositely disposed lateral openings, power transmission gear mounted on a suitable support, the gear support arranged to be passed together with the transmission gear through one of the openings and secured on the inner opposite side of the tube to close the other opening, and a cap arranged to close the first opening, of a drive shaft extending longitudinally within the axle with one end connected with the transmission gear and the other with the drive wheel of the vehicle.

2. In a motor vehicle, the combination, with an axle comprising a tubular body with an enlarged middle portion, having oppositely disposed lateral openings of dissimilar size, power transmission gear mounted on a suitable support, the gear support arranged to be passed together with the transmission gear through the larger of the openings and secured on the inner opposite side of the tube to close the smaller opening, and a cap arranged to close the larger opening, of drive shafts extending longitudinally within the axle with their inner ends connected with the transmission gear and their outer ends with the drive wheels of the vehicle.

3. In a motor vehicle, the combination, with an axle comprising a tubular body with an enlarged middle portion having oppositely disposed lateral openings, power transmission gear mounted on a suitable support, the gear support arranged to be passed together with the transmission gear through one of the openings, and secured on the opposite side of the tube to close the other opening, and a cap arranged to close the first opening, of drive shafts extending longitudinally within the axle with their inner ends connected with the transmission gear, a pinion on the outer end of each drive shaft, and teeth carried by the drive wheels and meshing with the pinion.

4. In a motor vehicle, the combination, with an axle comprising a tubular body with an enlarged middle portion having oppositely disposed lateral openings, power transmission gear mounted on a suitable support, the gear support arranged to be passed together with the transmission gear through one of the openings and secured on the opposite side of the tube to close the other opening, and a cap arranged to close the first opening, of drive shafts extending longitudinally within the axle, an axially disengageable coupling between the inner ends of the drive shafts and the transmission gear, a pinion on the outer end of each drive shaft, teeth carried by the drive wheels and meshing with the pinion, and a plate closing the outer ends of the tubular axle.

5. In a motor vehicle, the combination, with an axle comprising a tubular body with an enlarged middle portion having oppositely disposed lateral openings of dissimilar size, power transmission gear mounted on a suitable support, the gear support arranged to be passed together with the transmission gear through the larger of the openings and secured on the inner opposite side of the tube to close the smaller opening, and a cap arranged to close the larger opening, of drive shafts extending longitudinally within the axle at an angle to each other, a universal connection between the inner ends of the shafts and the transmission gear, and a connection between the outer ends of the shafts and the drive wheels of the vehicle.

6. In a motor vehicle, the combination, with an axle comprising a tubular body with an enlarged middle portion having oppositely disposed lateral openings of dissimilar size, power transmission gear mounted on a suitable support, the gear support arranged to be passed together with the transmission gear through the larger of the openings and secured on the inner opposite side of the tube to close the smaller opening, and a cap arranged to close the larger opening, of drive shafts extending longitudinally within the axle at an angle to each other, a universal joint interposed between the transmission gear and the inner ends of the shafts, an axially disengageable coupling between the inner ends of the axle and the universal joint, a pinion on the outer end of each drive shaft, teeth carried by the drive wheels and meshing with the pinion, and a cap closing the outer end of the tubular axle.

7. In a motor vehicle, the combination, with an axle comprising a tubular body with an enlarged middle portion having oppositely disposed lateral openings of dissimilar size, power transmission gear mounted on a suitable support, the gear support arranged to be passed together with the transmission gear through the larger of the openings and secured on the inner opposite side of the tube to close the smaller opening, and a cap arranged to close the larger opening, of drive shafts extending longitudinally within the axle at an angle to each other, a Cardan joint interposed between the transmission gear and the inner ends of the drive shafts, an axially disengageable coupling between the inner ends of the drive shafts and the Cardan joint, a pinion on the outer end of each drive shaft and beyond the tubular axle with radially extending teeth, inwardly extending teeth carried by the drive wheels and meshing with the teeth of the pinion, and a cap embracing the pinion and closing the outer end of the axle.

8. In transmission gearing, the combination with an axle receiving its movement from change speed gear, and differential mechanism, of a casing inclosing the said axle comprising a detachable end piece and bearings for said mechanism supported by the end piece.

9. In transmission gearing, the combination with an axle receiving its movement from change speed gear, and differential mechanism, of a casing inclosing the said axle comprising a detachable end piece, bearings for the axle supported by the casing, and bearing lugs on the end piece for the differential mechanism.

10. In transmission gearing, the combination with an axle receiving its movement from change speed gear, and differential mechanism, of a casing inclosing the said axle comprising a detachable end piece, bearings for the axle supported by the casing, bearing lugs on the end piece for the differential mechanism, and a detachable inclosing casing for the differential mechanism.

11. In transmission gearing, the combination with an axle receiving its movement from change speed gear, and differential mechanism, of a casing arranged in advance of the differential mechanism and inclosing said axle, and bearings for said differential mechanism supported by said casing so as to form a unit therewith.

12. In transmission gearing, the combination with an axle receiving its movement from change speed gear, and differential mechanism, of a casing inclosing said axle, and bearing lugs projecting from one end of said casing and in alinement with the axle and forming bearings for said differential mechanism.

13. In transmission gearing, the combination with an axle receiving its movement from change speed gear, and differential mechanism including driving and driven bevel gears, of a casing inclosing said axle, and bearings for said bevel gears supported by said casing and arranged in alinement therewith.

14. In transmission gearing, the combination with an axle receiving its movement from change speed gear, and differential mechanism, of a casing for said differential mechanism, a casing inclosing said axle and adapted to be detachably secured to said differential casing, and bearings for said differential mechanism supported by the second named casing.

15. In transmission gearing, the combination with an axle receiving its movement from change speed gear, and differential mechanism, of a casing for said differential mechanism provided with a front opening, a casing inclosing said axle and adapted to be detachably secured to said differential casing at said opening, and bearings for said differential mechanism supported by the second named casing.

16. In transmission gearing, the combination with an axle receiving its movement from change speed gear, and differential mechanism, of a casing for said differential mechanism, provided with a front opening, a casing inclosing said axle, bearing lugs projecting from an end wall of said change speed axle casing and forming bearings for said differential mechanism, and means for detachably securing said change speed axle casing to said differential casing with said differential mechanism in place in its casing.

17. In transmission gearing, the combination with an axle receiving its movement from change speed gear, and differential mechanism, of casings inclosing said axle and mechanism, bearings for said differential mechanism supported by said axle casing, and driven shafts extending into said differential casing and having a detachable connection with said differential mechanism.

18. In transmission gearing, the combination with an axle receiving its movement from change speed gear, and differential mechanism, of a sectional casing inclosing said axle, bearings for said axle supported by one of the casing sections and bearings for said differential mechanism supported by another of said casing sections, and driven shafts having a detachable connection with said differential mechanism.

19. In transmission gearing, the combination with an axle receiving its movement from change speed gear, and differential mechanism, of detachably connected casings inclosing said axle and mechanism and permitting the differential mechanism to be withdrawn from the differential casing with the change speed axle casing, bearing lugs projecting from an end wall of said change speed axle casing, hubs for said differential mechanism supported in said lugs, and driven shafts having a detachable connection to said hubs.

20. In a driving axle for motor vehicles, the combination of a tubular body having an enlarged middle portion with an opening through one wall thereof, a transmission gear comprising a differential mechanism and an axle receiving its movement from change speed gearing, a gear support on which the said transmission gear is operatively mounted, means for rigidly securing the gear support to the tubular body so as to close the said opening thereof and inclose the transmission gear with the differential mechanism operatively positioned in said body, and wheel driving shafts in the axle body disengageably connected at their inner ends to the differential mechanism, the aforesaid securing means being detachable and the gear support and the assembled transmission gear being separable as a unit from the tubular body.

21. In a driving axle for motor vehicles, the combination of an elongated tubular body having an enlarged middle portion with continuous top and bottom walls and an opening in its front wall, transmission gear including differential mechanism, a rigid support on which the transmission gear is operatively mounted, means for securing the support to the tubular body so as to close its said front opening and with the differential mechanism operatively positioned in said body, and wheel driving shafts in the axle body disengageably connected at their inner ends to the differential mechanism, the aforesaid securing means being detachable and the support and assembled transmission gear being separable as a unit from the tubular body.

22. In a driving axle for motor vehicles, the combination of an elongated tubular body having an enlarged middle portion with continuous top and bottom walls and oppositely disposed openings in its front and rear walls, transmission gear comprising differential mechanism, a rigid support on which the transmission gear is operatively mounted, means for securing the support to the axle body to close the said front opening and with the differential mechanism in operative position in said body, wheel-driving shafts in the axle body disengageably connected at their inner ends to the differential mechanism, and a removable cover which closes the rear opening of the axle body, the aforesaid securing means being detachable and the support and assembled transmission gear being separable as a unit from the tubular body.

23. In a driving axle for motor vehicles, the combination of a tubular body having an enlarged middle portion with an opening through one wall thereof, a rigid gear support, means extending through the wall of said tubular body adjacent said opening for rigidly securing said gear support thereto so as to close said opening and constitute with said enlarged middle portion a gear receiving chamber, a transmission gear including a differential mechanism mounted on said gear support and operatively disposed within said chamber, and wheel driving shafts in the axle body disengageably connected at their inner ends with the differential mechanism, the aforesaid securing means being detachable and the gear support and the assembled transmission gear being separable as a unit from the tubular body.

24. In a driving axle for motor vehicles, the combination of an elongated tubular body having an enlarged middle portion with oppositely disposed openings in its front and rear walls and with continuous top and bottom walls, power transmission gear comprising differential mechanism, an axle receiving its movement from change speed gear and gearing between said axle and differential mechanism, a gear support on which the transmission gear is operatively mounted, said support and power transmission gear extending through the said front opening of the axle body, means for securing the support to the axle body so as to close the last named opening, wheel driving shafts in the axle body disengageably connected at their inner ends to the differential mechanism, and a removable cover detachably connected to the axle body to close its said rear opening, the axle body, gear support and cover forming an inclosing casing for the transmission gear and the aforesaid securing means being detachable so that the support and assembled transmission gear can be separated as a unit from the tubular body.

25. In mechanism of the character described, the combination of a casing open on opposite sides and having two laterally extending tubes; detachable members for closing such openings in said casing, respectively; a driving pinion and differential mechanism carried by one of said members and removable from said casing along with said member; and two axle-sections disposed in said tubes and detachably connected at their inner ends with said differential mechanism.

In testimony whereof, we affix our signatures, in the presence of two witnesses.

JULES NICLAUSSE.
ALBERT NICLAUSSE.

Witnesses:
ANTOINE LAVOIS,
GEORGE E. LIGHT.

Correction in Reissue Letters Patent No. 14,201.

It is hereby certified that in Reissue Letters Patent No. 14,201, granted October 10, 1916, upon the application of Jules Niclausse and Albert Niclausse, of Paris, France, for an improvement in "Axles for Motor Road-Vehicles," an error appears in the printed specification requiring correction as follows: Page 1, line 83, after the first comma, insert the words *comprising the parts;* and that the said Letters Patent should be read with this correction therein that the same may conform to the record of the case in the Patent Office.

Signed and sealed this 21st day of November, A. D., 1916.

[SEAL.]

F. W. H. CLAY,

*Acting Commissioner of Patents.*

(Cl. 21—90.)